US012620752B2

(12) United States Patent
Li et al.

(10) Patent No.: US 12,620,752 B2
(45) Date of Patent: May 5, 2026

(54) SEALING RING POSITIONING COMPONENT AND CONNECTOR

(71) Applicant: Tyco Electronics (Shanghai) Co., Ltd., Shanghai (CN)

(72) Inventors: Xiaobing Li, Shanghai (CN); Siqi (Celina) Chen, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 305 days.

(21) Appl. No.: 18/243,362

(22) Filed: Sep. 7, 2023

(65) Prior Publication Data

US 2024/0088603 A1 Mar. 14, 2024

(30) Foreign Application Priority Data

Sep. 8, 2022 (CN) ......................... 202222385937.8

(51) Int. Cl.

| | |
|---|---|
| ***H01R 13/52*** | (2006.01) |
| ***H01R 13/506*** | (2006.01) |
| ***H01R 13/6582*** | (2011.01) |
| *H01R 13/642* | (2006.01) |

(52) U.S. Cl.

CPC ....... *H01R 13/5202* (2013.01); *H01R 13/506* (2013.01); *H01R 13/6582* (2013.01); *H01R 13/642* (2013.01)

(58) Field of Classification Search

CPC .............. H01R 13/5202; H01R 13/506; H01R 13/6582; H01R 13/642

See application file for complete search history.

(56) References Cited

U.S. PATENT DOCUMENTS

| | | | | |
|---|---|---|---|---|
| 8,109,789 | B2 * | 2/2012 | Tyler | H01R 13/58 439/587 |
| 2017/0187150 | A1 * | 6/2017 | Fabre | H01R 13/6593 |
| 2022/0285887 | A1 * | 9/2022 | Fabre | H01R 13/506 |

* cited by examiner

*Primary Examiner* — Sean Gugger

(74) *Attorney, Agent, or Firm* — Barley Snyder

(57) ABSTRACT

A sealing ring positioning component adapted to be fitted on an outer housing of a connector to position a sealing ring on the outer housing comprises a peripheral wall and a pushing protrusion formed on an inner peripheral surface of the peripheral wall. The pushing protrusion is adapted to be pushed on the outer sides of two half shells of a shielding shell of the connector such that splicing edges of the two half shells of the shielding shell are in contact with each other.

20 Claims, 7 Drawing Sheets

SEALING RING POSITIONING COMPONENT AND CONNECTOR

CROSS-REFERENCE TO RELATED APPLICATION

This application claims the benefit of Chinese Patent Application No. CN202222385937.8 filed on Sep. 8, 2022, in the State Intellectual Property Office of China, the whole disclosure of which is incorporated herein by reference.

FIELD OF THE INVENTION

The present invention relates to a sealing ring positioning component and a connector comprising the sealing ring positioning component.

BACKGROUND

In the prior art, a connector typically includes an outer housing, an inner housing, a terminal, and a shielding shell. The inner housing is installed in the outer housing, the terminal is installed in the inner housing, and the shielding shell is sheathed on the outside of the inner housing. The outer housing may be an integral injection molded part, while the shielding shell is usually an integral metal stamped part. The shielding shell may include an end wall and two half shells connected to the end wall. The two half shells are combined to form the outer circumference wall of the shielding shell. In the prior art, in order to facilitate injection molding (e.g., release from a mold), the outer housing needs to have a certain slope. However, as a result, the two half shells of the shielding shell cannot be fully closed, and a certain gap between the splicing edges of the two half shells is created. This gap reduces the electromagnetic shielding effect of the connector.

SUMMARY

According to an embodiment of the present disclosure, a sealing ring positioning component adapted to be fitted on an outer housing of a connector to position a sealing ring on the outer housing comprises a peripheral wall and a pushing protrusion formed on an inner peripheral surface of the peripheral wall. The pushing protrusion is adapted to be pushed on the outer sides of two half shells of a shielding shell of the connector such that splicing edges of the two half shells of the shielding shell are in contact with each other.

BRIEF DESCRIPTION OF THE DRAWINGS

The invention will now be described by way of example with reference to the accompanying Figures, of which.

DETAILED DESCRIPTION OF THE EMBODIMENTS

Figure 1:
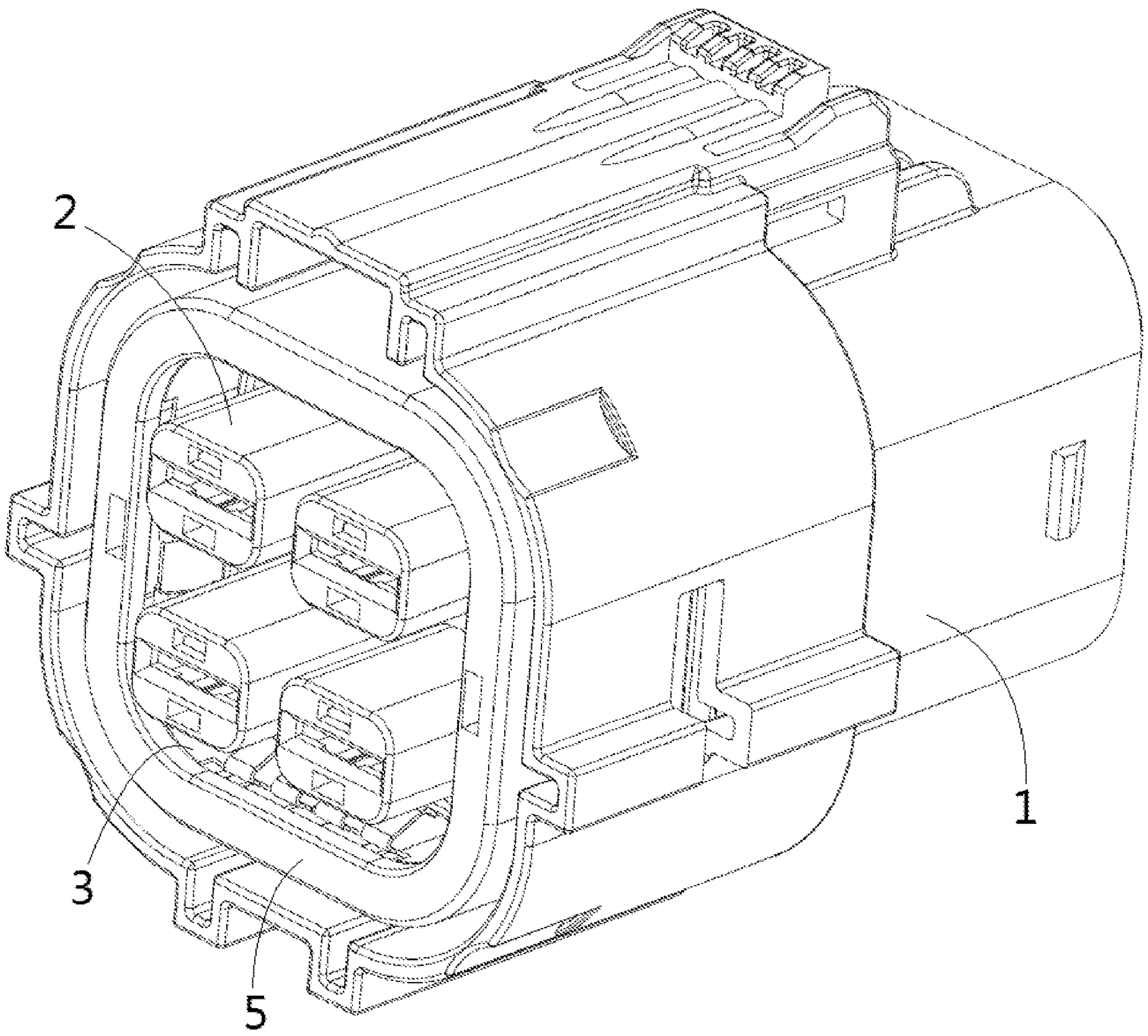
FIG. 1 is an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure a sealing ring positioning component is adapted to be fitted on an outer housing of a connector to position a sealing ring on the outer housing. The sealing ring positioning component comprises of a peripheral wall, and a pushing protrusion formed on an inner peripheral surface of the peripheral wall. The pushing protrusion is adapted to be pushed on the outer sides of two half shells of a shielding shell of the connector, such that the splicing edges of the two half shells of the shielding shell are in continuous contact with each other.

According to another embodiment of the present disclosure, a connector comprises an outer housing including a first peripheral wall and an inner cavity enclosed by the first peripheral wall, and an inner housing installed in the inner cavity of the outer housing and formed with a terminal slot. A terminal provided in the terminal slot of the inner housing. The inner housing is provided in a shielding shell of the connector. A sealing ring of the connector is sleeved on the first peripheral wall of the outer housing. The above-described sealing ring positioning component is sleeved on the rear end of the first peripheral wall and rests against the sealing ring. The shielding shell includes an end wall and two half shells connected to the end wall. The two half shells are combined to form the outer peripheral wall of the shielding shell. The pushing protrusion of the sealing ring positioning component is pushed onto the outer sides of the two half shells, such that the splicing edges of the two half shells of the shielding shell are in contact with each other without a gap therebetween.

Figure 2:
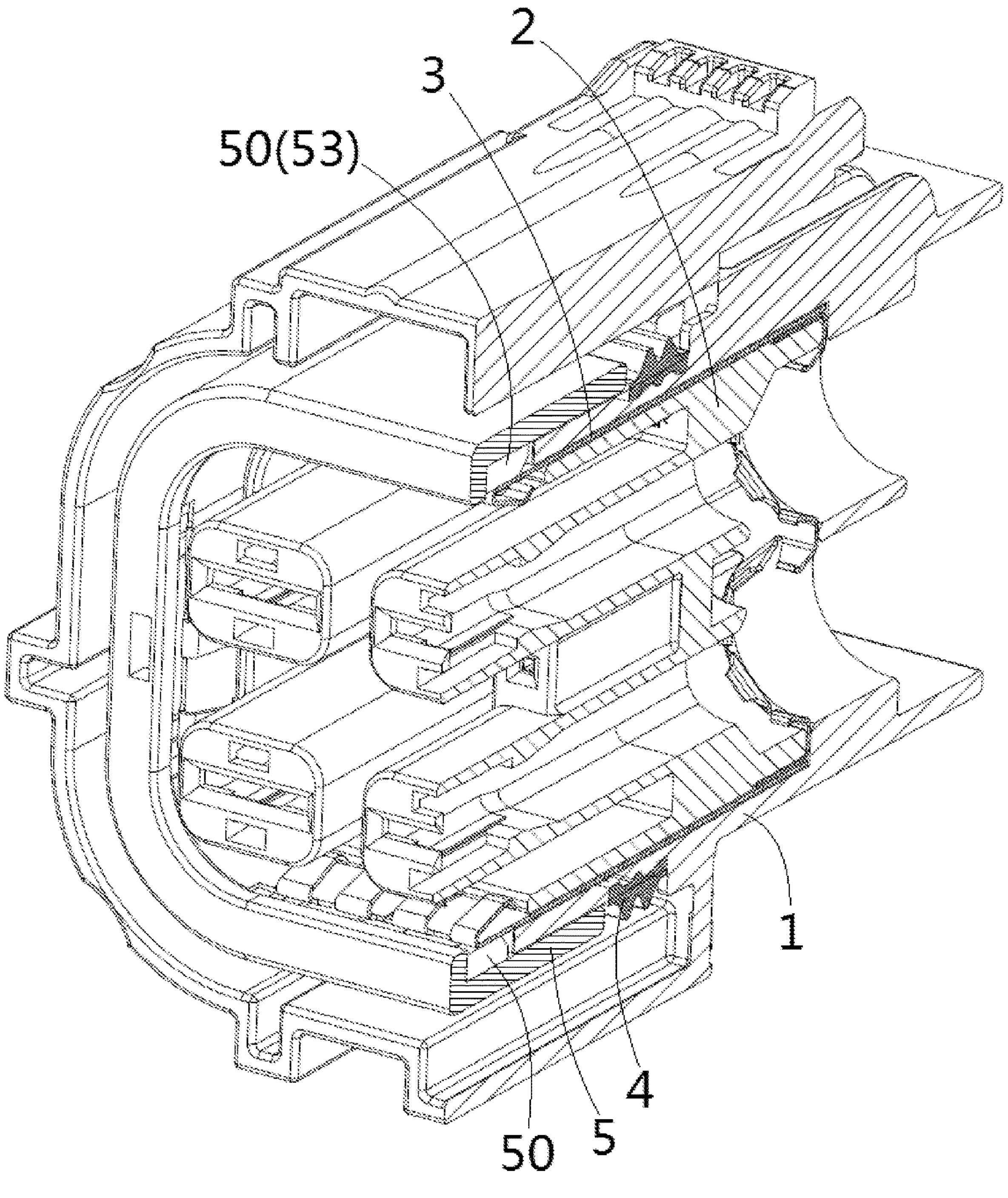
FIG. 2 is a longitudinal cross-sectional view of a connector according to an exemplary embodiment of the present invention.
Figure 3:
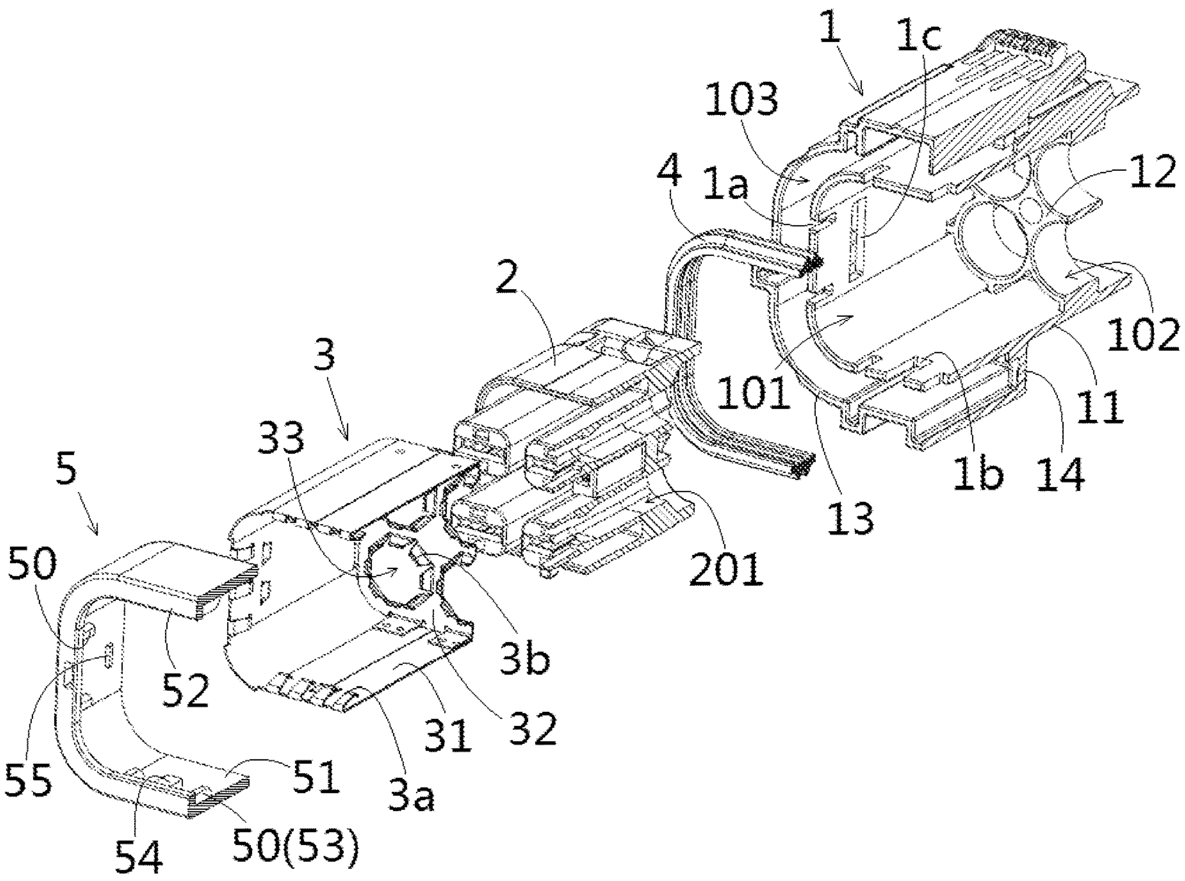
FIG. 3 is an illustrative exploded view of a connector according to an exemplary embodiment of the present invention.

FIG. 1 is an illustrative perspective view of a connector according to an exemplary embodiment of the present invention. FIG. 2 is a longitudinal cross-sectional view of a connector according to an exemplary embodiment of the present invention. FIG. 3 is an illustrative exploded view of a connector according to an exemplary embodiment of the present invention.

As shown in FIGS. 1-3, in the illustrated embodiments, the connector includes an outer housing 1, an inner housing 2, a terminal, a shielding shell 3, a sealing ring 4, and a sealing ring positioning component 5. The outer housing 1 includes a first peripheral wall 11 and an inner cavity 101 surrounded by the first peripheral wall 11. The inner housing 2 is installed in the inner cavity 101 of the outer housing 1. The terminal is arranged in a terminal slot 201 of the inner housing 2. The inner housing 2 is arranged in the shielding shell 3. The sealing ring 4 is installed on the first peripheral wall 11. The sealing ring positioning component 5 is installed on the rear end of the first peripheral wall 11 and rests against the sealing ring 4. The shielding shell 3 includes an end wall 32 and two half shells 31*a* connected to the end wall 32. Two half shells 31*a* can be opened and closed. When the two half shells 31*a* are closed, the two half shells 31*a* are combined to form the outer peripheral wall 31 of the shielding shell 3.

Figure 4:
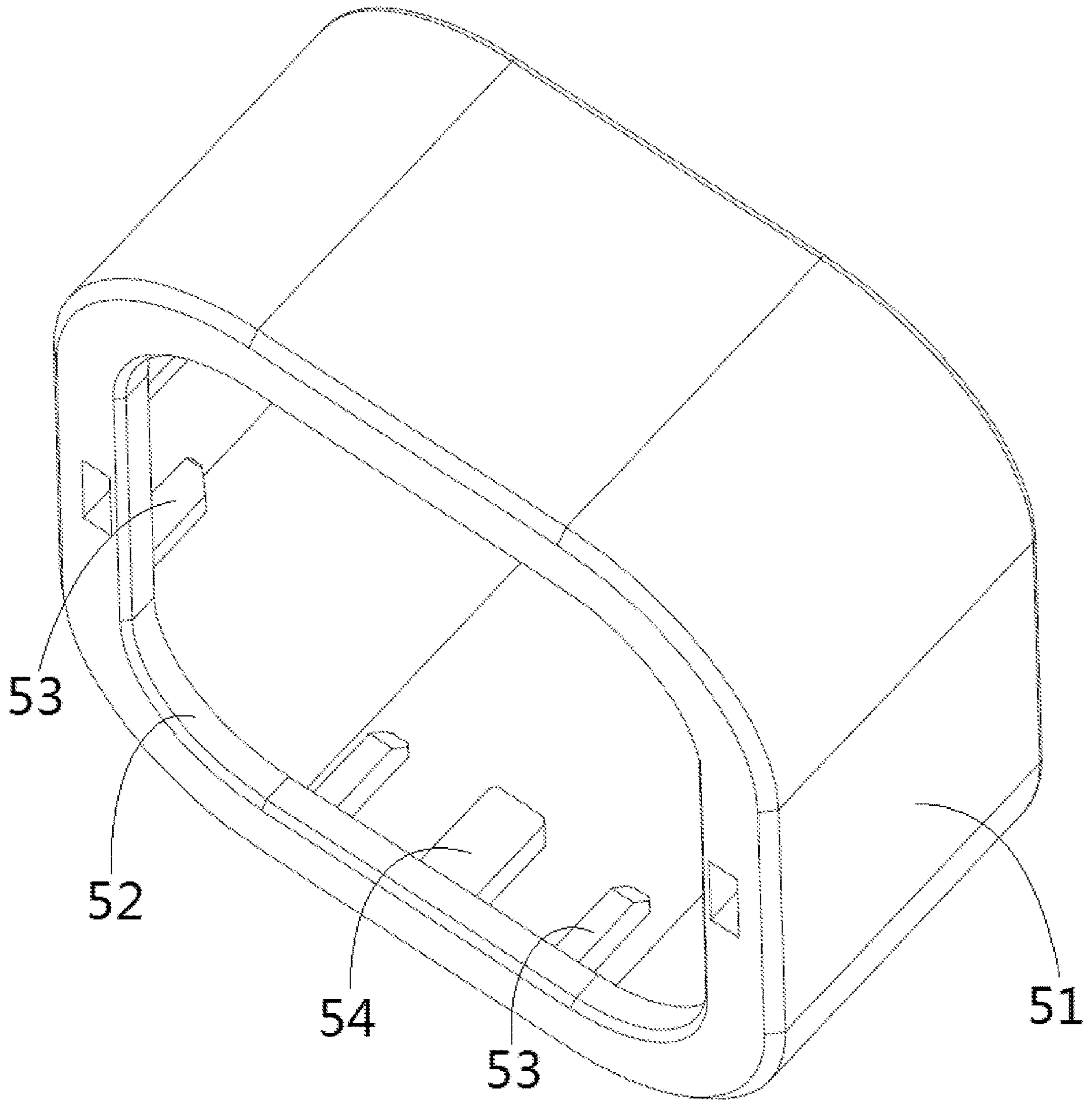
FIG. 4 is an illustrative perspective view of the sealing ring positioning component of the connector according to an exemplary embodiment of the present invention when viewed from the rear side.
Figure 5:
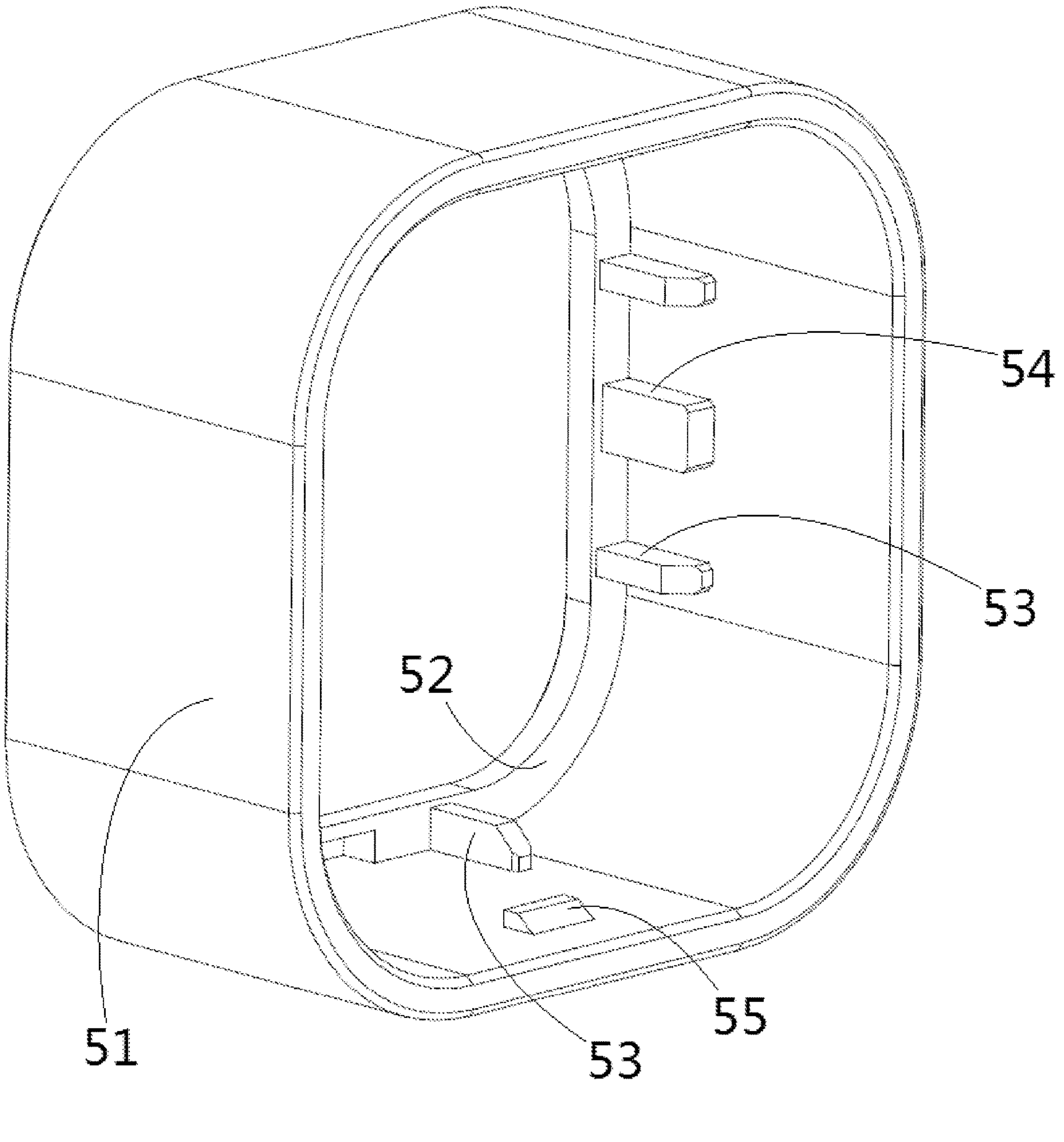
FIG. 5 is an illustrative perspective view of the sealing ring positioning component of a connector according to an exemplary embodiment of the present invention when viewed from the front side.
Figure 6:
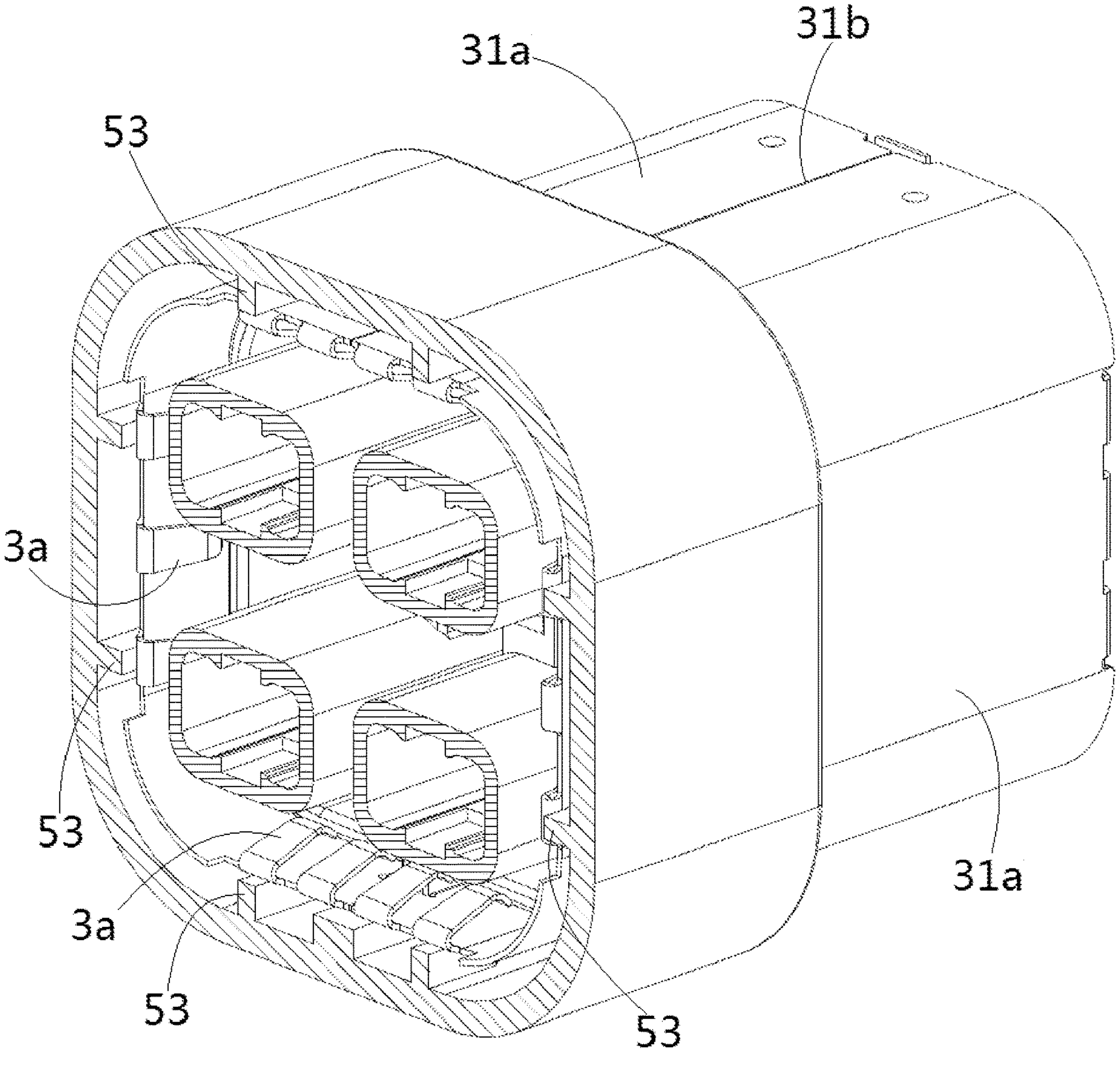
FIG. 6 is a transverse cross-sectional view of a connector according to an exemplary embodiment of the present invention, where the outer housing is not shown.
Figure 7:
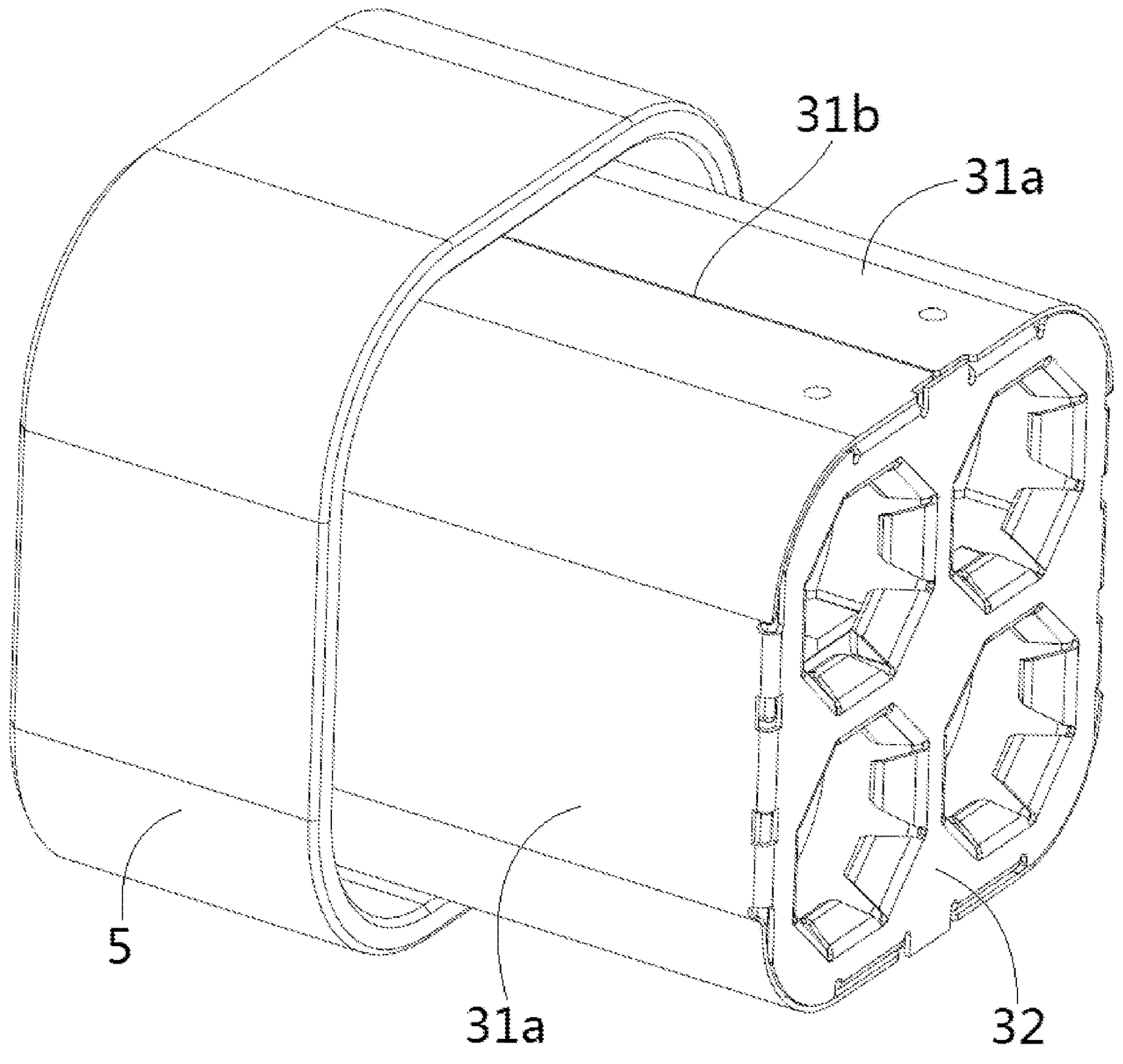
FIG. 7 is an illustrative perspective view of a connector according to an exemplary embodiment of the present invention when viewed from the front side, where the outer housing is not shown.

FIG. 4 is an illustrative perspective view of the sealing ring positioning component 5 of the connector according to an exemplary embodiment of the present invention when viewed from the rear side. FIG. 5 is an illustrative perspective view of the sealing ring positioning component 5 of the connector according to an exemplary embodiment of the present invention when viewed from the front side. FIG. 6 is a transverse cross-sectional view of a connector according to an exemplary embodiment of the present invention, where the outer housing 1 is not shown. FIG. 7 is an illustrative perspective view of a connector according to an exemplary embodiment of the present invention when viewed from the front side, where the outer housing 1 is not shown.

As shown in FIGS. 1-7, in an exemplary embodiment of the present invention, a sealing ring positioning component 5 is disclosed. The sealing ring positioning component 5 is suitable for fitting on the outer housing 1 of the connector, and is used to position the sealing ring 4 on the outer housing 1. The sealing ring positioning component 5 includes: a peripheral wall 51 and a pushing protrusion 50. The pushing protrusion 50 is formed on the inner peripheral surface of the peripheral wall 51. The pushing protrusion 50 is used to push on the outer sides of the two half shells 31*a* of the shielding shell 3 of the connector, so that the splicing edges 31*b* of the two half shells 31*a* of the shielding shell come into contact with each other without gap, thereby improving the electromagnetic shielding effect of the connector.

The pushing protrusion 50 includes multiple protrusion ribs 53. Each protruding rib 53 extends along the axial direction of the sealing ring positioning component 5. Multiple protruding ribs 53 are distributed at intervals in the circumferential direction of the sealing ring positioning component 5, used to push the outer sides of the two half shells 31*a* of the shielding shell 3. In the illustrated embodiment, the protruding rib 53 is plate-shaped and perpendicular to the peripheral wall 51.

However, the structure of the pushing protrusion 50 is not limited to the illustrated embodiment. For example, in another exemplary embodiment of the present invention, the pushing protrusion 50 may include multiple protruding ribs, each extending along the circumferential direction of the sealing ring positioning component 5. Multiple protruding ribs are distributed at intervals in the circumferential direction of the sealing ring positioning component 5, used to push the outer sides of the two half shells 31*a* of the shielding shell 3. In another exemplary embodiment of the present invention, the pushing protrusion 50 may include a single protrusion rib, which extends one circle along the circumferential direction of the sealing ring positioning component 5 to push the outer sides of the two half shells 31*a* of the shielding shell 3.

A guide surface 53*a* is formed on the front end of the protruding rib 53. In one embodiment, the guide surface 53*a* is inclined to the axial direction of the sealing ring positioning component 5. The guide surface 53*a* is adapted to guide the two half shells 31*a* of the shielding shell 3 into the accommodation space surrounded by multiple protruding ribs 53.

In the illustrated embodiment, the peripheral wall 51 of the sealing ring positioning component 5 has a front end and a rear end opposite to each other in the axial direction of the sealing ring positioning component. The front end of the peripheral wall 51 of the sealing ring positioning component 5 is adapted to rest against the rear side of the sealing ring 4 to axially position the sealing ring 4.

Multiple protruding ribs 53 are adjacent to the rear end of the peripheral wall 51. The ribs 53 are adapted to push the outer sides of the rear ends of the two half shells 31*a* of the shielding shell 3. In the illustrated embodiment, the rear end of the shielding shell 3 is an opened end with a rear port.

The sealing ring positioning component 5 includes a positioning flange 52, which is formed on the rear end of the peripheral wall 51 and radially protrudes towards the inner side of the sealing ring positioning component 5. The positioning flange 52 adapted to rest against the rear end face of a first peripheral wall 11 of the outer housing 1, and to axially position the sealing ring positioning component 5. In the illustrated embodiment, the rear end of the protruding rib 53 is connected to the inner side of the positioning flange 52.

The sealing ring positioning component 5 further includes a buckle protrusion 55, which is formed on the inner surface of the peripheral wall 51. The buckle protrusion 55 is adapted to be engaged into a snapping slot 1*c* on the outer housing 1. The buckle protrusion 55 is further adapted to fix the sealing ring positioning component 5 to the housing 1. The sealing ring positioning component 5 further includes a fool-proofing protrusion 54, which is formed on the inner surface of the peripheral wall 51. The fool-proofing protrusion 54 is suitable for inserting into a fool-proofing or error-proofing slot 1*b* on the outer housing 1 to ensure that the sealing ring positioning component 5 is installed in the correct orientation on the outer housing 1. The sealing ring positioning component 5 is an integral part. For example, the sealing ring positioning component 5 can be an integrated injection molded part.

Still referring to FIGS. 1 to 7, in an exemplary embodiment of the present invention, a connector is also disclosed. The connector includes an outer housing 1, inner housing 2, a terminal, a shielding shell 3, a sealing ring 4, and the aforementioned sealing ring positioning component 5. The outer housing 1 includes a first peripheral wall 11 and an inner cavity 101 surrounded by the first peripheral wall 11. The inner housing 2 is installed in the inner cavity 101 of the outer housing 1. The terminal is arranged in a terminal slot 201 of the inner housing 2. The inner housing 2 is arranged in the shielding shell 3. The sealing ring 4 is installed on the first peripheral wall 11. The sealing ring positioning component 5 is installed on the rear end of the first peripheral wall 11 and rests against the sealing ring 4. The shielding shell 3 includes an end wall 32 and two half shells 31*a* connected to the end wall 32. Two half shells 31*a* can be opened and closed. When the two half shells 31*a* are closed, the two half shells 31*a* are combined to form the outer peripheral wall 31 of the shielding shell 3. The pushing protrusion 50 is pushed onto the outer sides of the two half shells 31*a*, causing the splicing edges 31*b* of the two half shells 31*a* of the shielding shell 3 to come into contact with each other without gap.

In the illustrated embodiment, multiple slots 1*a* are formed on the rear end of the outer housing 1. The multiple slots 1*a* are spaced in the circumferential direction of the outer housing 1. The multiple protruding ribs 53 on the sealing ring positioning component 5 are inserted into multiple slots 1*a* and rest against the outer sides of the two half shells 31*a* of the shielding shell 3.

A snapping slot 1*c* is formed on the first peripheral wall 11. The snapping slot 1*c* engages with the buckle protrusion 55 on the sealing ring positioning component 5 to fix the sealing ring positioning component 5 to the first peripheral wall 11. A fool-proofing or error-proofing slot 1*b* is formed on the first peripheral wall 11. The fool-proofing slot 1*b* is engaged with the fool-proofing protrusion 54 on the sealing ring positioning component 5 to ensure that the sealing ring positioning component 5 is installed on the outer housing 1 in the correct orientation.

The outer housing 1 further comprises a second peripheral wall 13 and a radial wall 14. The second peripheral wall 13 surrounds the first peripheral wall 11. The radial wall 14 is connected between the first peripheral wall 11 and the second peripheral wall 13. There is a gap 103 between the first peripheral wall 11 and the second peripheral wall 13 to allow the insertion of a mating housing (not shown) of a mating connector (not shown). The sealing ring 4 is suitable for being radially compressed between the first peripheral wall 11 of the outer housing 1 and the mating housing to achieve sealing between the two. In the illustrated embodiment, the front and rear sides of the sealing ring 4 respectively rest against the radial wall 14 and the sealing ring positioning component 5 to axially position the sealing ring 4.

The housing 1 further includes a front end wall 12 connected to the front end of the first peripheral wall 11. A cable hole 102 is formed in the front end wall 12 of the outer housing 1, and a cable through hole 33 is formed in the end wall 32 of the shielding shell 3. The connector also includes a cable (not shown), with one end of the cable inserted into the terminal slot 201 through cable hole 102 and cable through hole 33 and electrically connected to the terminal (not shown).

Multiple first elastic pieces 3*a* are formed on the rear edge of the outer peripheral wall 31 of the shielding shell 3, which are bent towards the interior of the shielding shell 3. The first elastic pieces 3*a* are used for elastic electrical contact with a mating shielding shell (not shown) of the mating connector. Multiple second elastic pieces 3*b* are formed on the edge of the cable through hole 33 of the shielding shell 3, bent towards the interior of the shielding shell 3, and are used for elastic electrical contact with a shielding layer (not shown) of the cable (not shown). The shielding shell 3 is in direct contact with the shielding layer of the cable, which can improve the electromagnetic shielding effect of the connector.

Multiple protruding ribs 53 on the sealing ring positioning component 5 rest against the outer side of the rear end of the shielding shell 3, providing support for multiple first elastic pieces 3*a*. In this way, the elastic contact force between multiple first elastic pieces 3*a* and the mating shielding shell can be increased. This ensures reliable electrical contact between the shielding shell 3 and the mating shielding shell.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A sealing ring positioning component adapted to be fitted on an outer housing of a connector to position a sealing ring on the outer housing, comprising:
- a peripheral wall; and
- a pushing protrusion formed on an inner peripheral surface of the peripheral wall, the pushing protrusion adapted to be pushed on the outer sides of two half shells of a shielding shell of the connector, so that splicing edges of the two half shells of the shielding shell are in contact with each other.

2. The sealing ring positioning component according to claim 1, wherein the pushing protrusion comprises multiple protruding ribs extending along an axial direction of the sealing ring positioning component, the multiple protruding ribs are spaced in a circumferential direction of the sealing ring positioning component.

3. The sealing ring positioning component according to claim 1, wherein the pushing protrusion comprises multiple protruding ribs extending along a circumferential direction of the sealing ring positioning component, the multiple protruding ribs are spaced in the circumferential direction of the sealing ring positioning component.

4. The sealing ring positioning component according to claim 1, wherein the pushing protrusion comprises a single protruding rib continuously extending along a circumferential direction of the sealing ring positioning component.

5. The sealing ring positioning component according to claim 2, wherein the protruding ribs are plate-shaped and perpendicular to the peripheral wall.

6. The sealing ring positioning component according to claim 2, wherein a guide surface is formed on the front end of the protruding ribs, the guide surface is inclined to the axial direction of the sealing ring positioning component and is adapted to guide the two half shells of the shielding shell into a space surrounded by the multiple protruding ribs.

7. The sealing ring positioning component according to claim 2, wherein:

the peripheral wall has a front end and a rear end arranged opposite to each other in the axial direction of the sealing ring positioning component; and the front end of the peripheral wall rests against the rear side of the sealing ring to axially position the sealing ring.

8. The sealing ring positioning component according to claim 7, wherein the multiple protruding ribs are adjacent to the rear end of the peripheral wall and rest against the outer sides of the rear ends of the two half shells of the shielding shell.

9. The sealing ring positioning component according to claim 2, further comprising a positioning flange formed on a rear end of the peripheral wall and protruding radially towards an inner side of the sealing ring positioning component, the positioning flange is adapted to rest against a rear end face of a first peripheral wall of the outer housing for axially positioning the sealing ring positioning component.

10. The sealing ring positioning component according to claim 9, wherein the rear end of the protruding rib is connected to the inner side of the positioning flange.

11. The sealing ring positioning component according to claim 1, further comprising a buckle protrusion formed on the inner surface of the peripheral wall, the buckle protrusion is adapted to be snapped into a snapping slot on the outer housing for fixing the sealing ring positioning component to the outer housing.

12. The sealing ring positioning component according to claim 1, further comprising an error-proofing protrusion formed on the inner surface of the peripheral wall, the error-proofing protrusion is adapted to be inserted into an error-proofing slot on the outer housing to ensure that the sealing ring positioning component is installed in the correct orientation on the outer housing.

13. The sealing ring positioning component according to claim 1, wherein the sealing ring positioning component is an integral part.

14. A connector, comprising:

an outer housing including a first peripheral wall and an inner cavity enclosed by the first peripheral wall;

an inner housing installed in the inner cavity of the outer housing and formed with a terminal slot;

a terminal provided in the terminal slot of the inner housing;

a shielding shell in which the inner housing is arranged, including an end wall and two half shells connected to the end wall, the two half shells are combined to form the outer peripheral wall of the shielding shell;

a sealing ring sleeved on the first peripheral wall of the outer housing; and a sealing ring positioning component, including:

a peripheral wall; and a pushing protrusion formed on an inner peripheral surface of the first peripheral wall, the pushing protrusion adapted to be pushed on the outer sides of two half shells of a shielding shell of the connector and biasing splicing edges of the two half shells of the shielding shell into contact with each other, the positioning component sleeved on a rear end of the first peripheral wall and resting against the sealing ring.

15. The connector according to claim 14, wherein:

multiple slots are formed on the rear end of the outer housing and are spaced in a circumferential direction of the outer housing; and the pushing protrusion includes multiple protrusion ribs inserted into respective ones of the multiple slots and resting against the outer sides of the two half shells of the shielding shell.

16. The connector according to claim 14, wherein a snapping slot is formed on the first peripheral wall, and the snapping slot is engaged with the buckle protrusion on the sealing ring positioning component to fix the sealing ring positioning component to the first peripheral wall.

17. The connector according to claim 14, wherein an error-proofing slot is formed on the first peripheral wall, the error-proofing slot engaged with an error-proofing protrusion on the sealing ring positioning component to ensure that the sealing ring positioning component is installed on the outer housing in the correct orientation.

18. The connector according to claim 14, wherein the outer housing further comprises:

a second peripheral wall surrounding the first peripheral wall; and a radial wall connected between the first peripheral wall and the second peripheral wall, wherein:

a gap is formed between the first peripheral wall and the second peripheral wall to allow the insertion of a mating housing of a mating connector;

front and rear sides of the sealing ring respectively rest against the radial wall and the sealing ring positioning component to axially position the sealing ring; and the sealing ring is adapted to be radially compressed between the mating housing and the first peripheral wall of the outer housing to achieve sealing between the two.

19. The connector according to claim 18, wherein:

the outer housing further comprises a front end wall connected to a front end of the first peripheral wall, a cable hole is formed in the front end wall of the outer housing, and a cable through hole is formed in the end wall of the shielding shell; and the connector further comprises a cable, one end of which is inserted into the terminal slot through the cable hole and the cable through hole and electrically connected to the terminal.

20. The connector according to claim 19, wherein:

multiple first elastic pieces bent towards the interior of the shielding shell are formed on a rear edge of the outer peripheral wall of the shielding shell, the first elastic pieces are adapted to electrically contact a mating shielding shell of the mating connector;

multiple second elastic pieces bent towards the interior of the shielding shell are formed on an edge of the cable through hole of the shielding shell, and the multiple second elastic pieces are adapted to electrically contact a shielding layer of the cable; and the pushing protrusions of the sealing ring positioning component rests against an outer side of the rear end of the shielding shell and supporting the first elastic pieces.

* * * * *